Dec. 1, 1959  F. KAHN  2,915,704
DEMAND RECORDING SYSTEM
Filed Jan. 25, 1956  4 Sheets-Sheet 1

FIG_1_

INVENTOR:
Frank Kahn,
BY Paul & Paul
ATTORNEYS.

Dec. 1, 1959    F. KAHN    2,915,704
DEMAND RECORDING SYSTEM
Filed Jan. 25, 1956    4 Sheets-Sheet 2

INVENTOR:
Frank Kahn,
BY Paul & Paul
ATTORNEYS.

INVENTOR:
Frank Kahn,
BY
Paul & Paul
ATTORNEYS.

Dec. 1, 1959   F. KAHN   2,915,704
DEMAND RECORDING SYSTEM
Filed Jan. 25, 1956   4 Sheets-Sheet 4

INVENTOR.
Frank Kahn,
BY
Paul & Paul
ATTORNEYS.

United States Patent Office

2,915,704
Patented Dec. 1, 1959

2,915,704

DEMAND RECORDING SYSTEM

Frank Kahn, Abington, Pa.

Application January 25, 1956, Serial No. 561,282

7 Claims. (Cl. 324—103)

This invention relates to a demand recording system for recording increments of electrical demand which are imposed on a source by a user of electricity it is also applicable to the recording of demands of other types.

It is an object of this invention to provide a simple and adaptable device which makes a timed record of the history of consumption of electricity by any electrical load.

Conventional graphic electric demand meters are arranged to record graphically the increments of power consumption of a consumer such as an electrical device, a house, factory, or other user of electricity. Conventional graphic demand meters of the block interval type are arranged to record on a circular or strip chart, for each time interval, a line transverse to the direction of chart movement, whose length is proportional to the energy passing through the circuit for that interval.

The demand meter is not complete in itself, but is operated by a contact device included in an associated watthour meter, and merely records the number of impulses received. Each of these impulses corresponds to a discrete increment or predetermined quantum of energy integrated.

The demand meter thus provides a record of the energy transmitted by the circuit, from which load studies can be made. Analysis of present graphic demand meter records, however, involves tedious reading of charts. Because of the resulting eyestrain, this work is taxing to personnel and is usually undertaken with reluctance. Another undesirable aspect of load studies from such charts is the relatively long time required for chart reading and for processing the data.

It is an object of this invention to provide a device of the character indicated which overcomes the difficulties just discussed. Another object is to provide a device for making a tape recording of a load history of a consumer of electricity, which tape recording has visible markings corresponding to the increments or quanta or energy consumed. Still another object is to provide a tape recording means which includes a play-back means for rapid, automatic processing of the data recorded. Other objects and advantages of the invention will appear in further detail hereinafter, and in the drawings, whereof:

Figure 1:
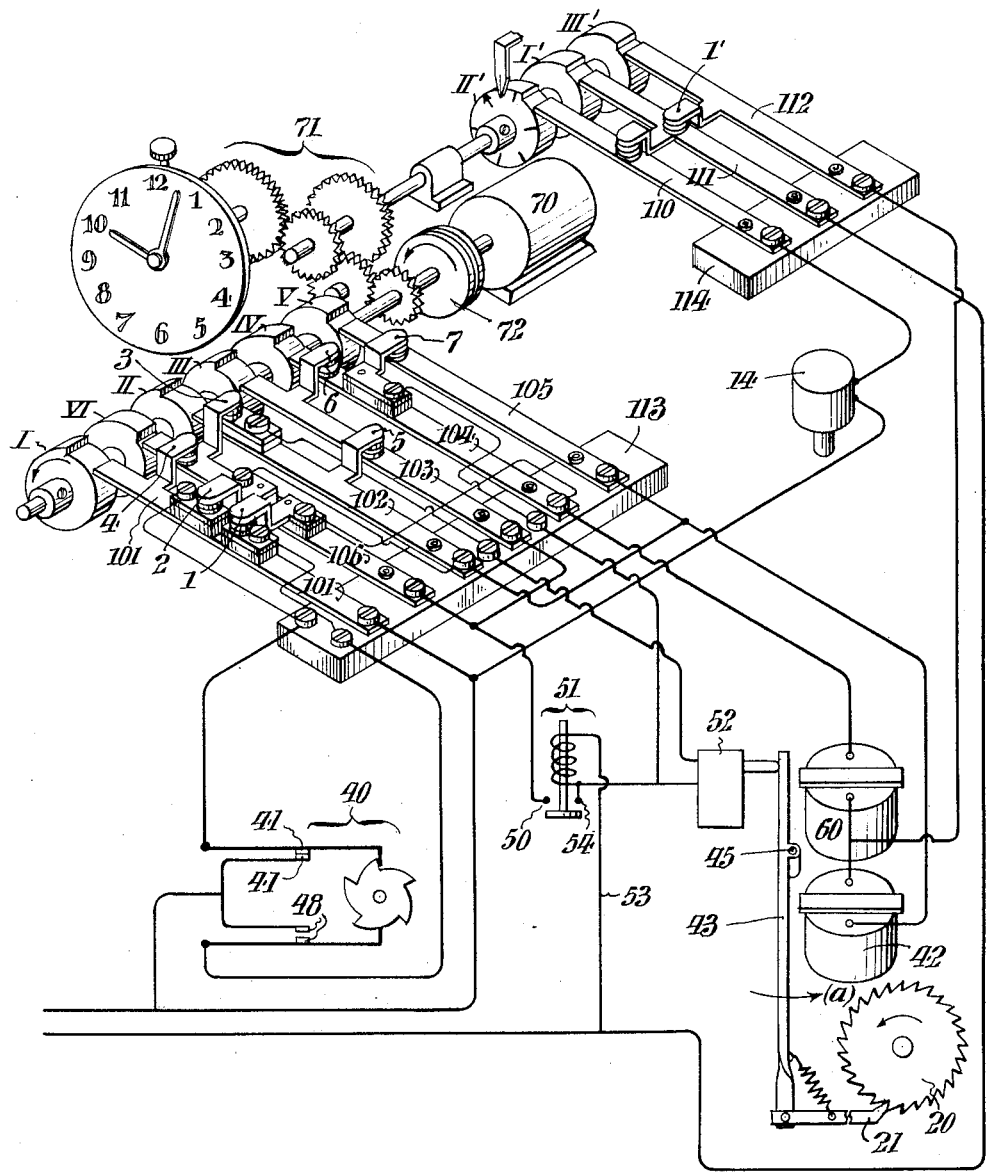
Fig. 1 represents a view in perspective of a preferred form of an actuating mechanism for the tape recording means in accordance with this invention.
Figure 2:
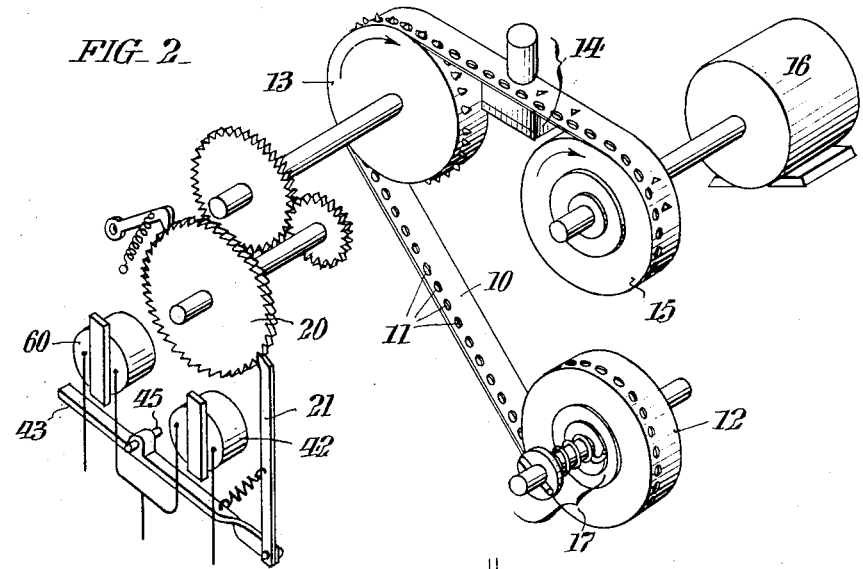
Fig. 2 represents a perspective view similar to Fig. 1, showing one form of recording means in accordance with this invention.
Figure 3:
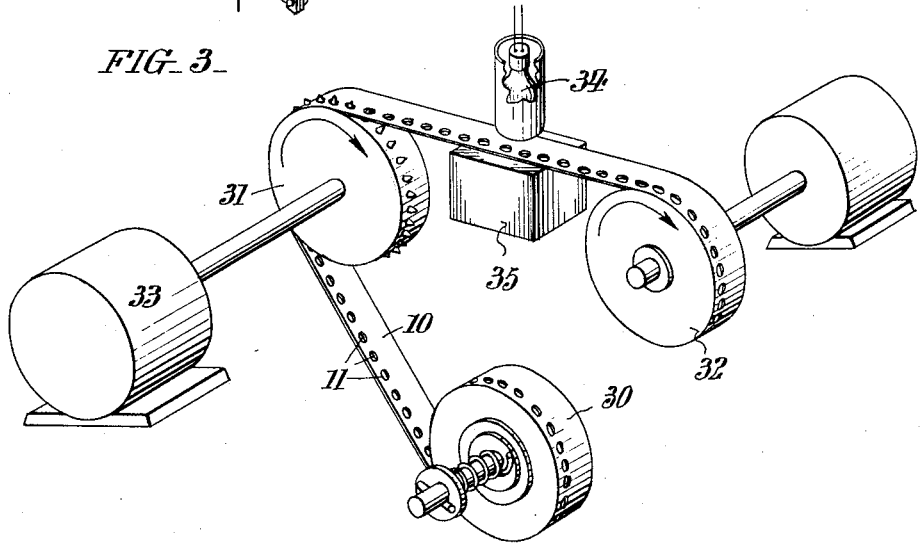
Fig. 3 represents a perspective view of a preferred form of a playback means embodying features of this invention.

The demand recording and processing system illustrated in Figs. 1 and 2 has been devised to provide rapid and efficient conversion to data cards of demand impulses received from the watthour meter, by means of a tape recorder (as shown in Fig. 2) and a translator (as shown in Fig. 3). This system eliminates visual reading of charts and manual processing of the data.

Fig. 2 is a schematic view of a recorder system comprising essentially a paper tape 10 and its drive and punch mechanisms. The paper tape 10 has longitudinally-spaced sprocket holes 11 and feeds from a supply roll 12 over a drive sprocket 13, past an interval punch 14, and is then wound on a reroll 15. The tape is maintained under light tension by a torque motor 16 driving the reroll 15 and a friction device 17 retarding the supply roll 12. Accordingly, very little torque is required of the drive sprocket 13 which is geared down from a ratchet wheel 20 which is stepped forward by a pawl 21 actuated in turn by the armature of a solenoid coil 42 which in turn is energized through the watthour meter contact device 40, as will appear in further detail hereinafter.

The device of Fig. 2, in conjunction with a conventional watthour meter equipped with a contact device, together with the auxiliary timing apparatus of Fig. 1, which will be subsequently explained, constitutes the apparatus intended to be located on the consumer's premises for producing a field tape record. The consumer may, for example, be a factory, shop or home, equipped with one or more conventional electric power meters. For each cycle of operation of the meter contact device, the tape is advanced a small increment of length or "demand increment," corresponding to a quantum of energy integrated by the watthour meter. For each demand interval the tape is accordingly advanced a distance corresponding to the increment of electric power consumption occurring during the interval. In addition to this action, during each demand interval the tape is advanced a definite "dead space" distance, for purposes to be later explained, which is equal in length to a constant predetermined number of demand increments. Also, at the end of the demand interval, the tape is perforated by a demand interval punch.

Figure 4:
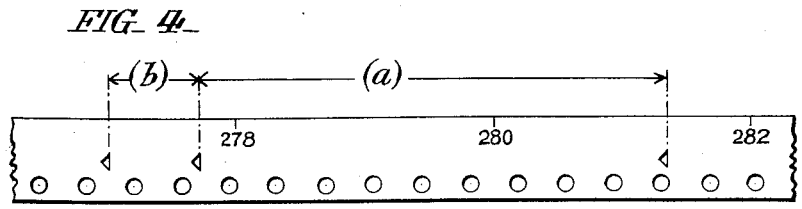
Fig. 4 represents a face view of a representative sample of tape which has been marked by the recording apparatus of Figs. 1 and 2.

Over any selected period of operation, the tape will have been advanced a distance equal to the product of the demand increment by the number of operations of the watthour meter contact device plus the product of the dead space distance by the number of demand intervals in the selected period. Accordingly, if the accumulated dead-space distance for the period under consideration is subtracted from the overall tape length for said period the remainder is proportional to the watthour meter registration for that period. To simplify measurement of tape length, the tape is marked off in inches or other units of length, as illustrated in Fig. 4. To facilitate observations of tape length, an unmarked leader may be used with the tape to permit starting the record period at "zero" tape marking.

Fig. 3 is a schematic view of a play-back system for playing back and processing the tape. This system comprises a supply roll 30, drive sprocket 31 and reroll 32 similar to those of Fig. 2, but the sprocket 31 is driven by a synchronous motor 33 rather than by a ratchet. Between the sprocket 31 and reroll 32 the tape 10 intercepts a beam from a lamp 34 to a photoelectric pick-up or photocell 35 arranged in such manner as to sense the demand-interval punched holes. The elapsed time between successive actuations of the photocell is proportional to the length of tape advance for the respective demand interval. Referring to Fig. 4, the portion (a) of the tape is proportional to demand, while the portions (b) are equivalent to accumulated dead space. Subtracting from the total elapsed times (proportional to a plus b) a value of time corresponding to the accumulated traverse of the dead space (dead-space time b) provides time measurements which are directly proportional to the energy demands (demand time) during the respective demand intervals. Expressed otherwise, the elapsed time between actuations of the photocell is equal to the demand time plus the dead-space time. There is thus provided a relatively simple analogue means for reading out the data.

It may be desirable to reroll the tape so that it will be played back in the same sequence as it was recorded. This rerolling provides an opportunity, if desired, of inspecting the tape and checking the time by providing an automatic count of the demand intervals. This can be done readily by a modified play-back system, as will be apparent.

The tape is marked in the field for time of start and time of removal. The total number of demand intervals which should have been recorded on the tape is then easily ascertained and should compare exactly with the tape-inspection count of demand intervals. This check may be used as a precaution to prevent further processing of a defective record.

Furthermore, this inspection system can be arranged, by suitable setting of appropriate dials, to mark the chart for time or to stop the chart for visual inspection at a selected time.

Figure 6:
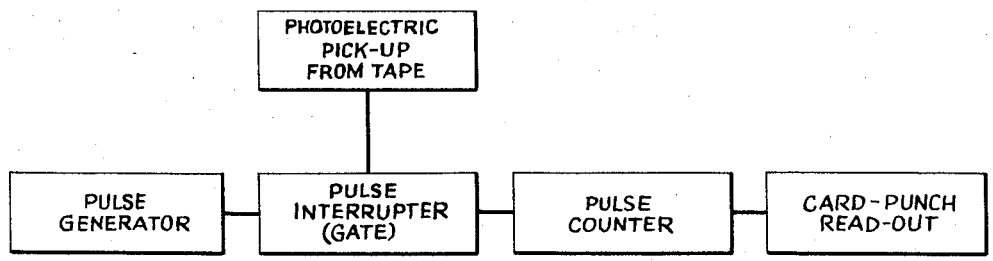
Fig. 6 represents a read-out system for processing the recorded data.

Essentially, a typical read-out system as shown in Fig. 6 comprises an electronic pulse generator and a pulse counter, both of conventional type, the counter being arranged for registering in digits corresponding to a definite number of pulses. The pulse generator and counter are coupled through a conventional electronic pulse interrupter, or gate, actuated by the play-back system of Fig. 3 in such manner that, between any two actuations of the photocell 35, pulses are transmitted to the counter during the demand time but not during the dead-space time. A purpose of the dead-space time is to provide a suitable delay for translation to cards or tape of the information registered by the pulse counter and for resetting it automatically in readiness for the next demand interval. In addition to permitting automatic read-out of separate energy demands for individual demand intervals, an important function of the dead space is to provide a simple, visible and readily interpreted record of the occurrence and of the time of occurrence of each such interval. This permits the tape record to be accurately correlated with time and all or part of the elapsed time to be determined or automatically read out independently of the record of demand. In the absence of the dead spaces this would not be possible because the interval punch operates at regular time intervals irrespective of whether or not there is any advance of the tape due to demand accumulations, and during periods of zero demand the interval punch would accordingly continue to repunch the same perforation in the tape no matter how many such zero-demand intervals would elapse. It is therefore obvious that in the absence of the dead spaces, should there be any demand intervals of zero-demand, particular times or intervals could not be accurately identified nor could the overall time be checked from inspection or read-out of the tape. Similarly, for periods of low average demand the perforations could overlap and confuse time correlations. In my system, however, the dead space assures a fixed minimum space between successive perforations (and thus between successive demand interval records of demand) independently of the demand. This permits ready identification of a particular demand interval or an overall check of elapsed record time by counting from a datum up to a predetermined number of perforations to identify a specific demand interval, or by counting all the perforations over a given period to ascertain that no interruptions of electric service have occurred during that period.

Fig. 1 shows schematic details of the system for producing a definite increment of tape advance for each demand impulse received from the watthour meter, and for providing the required dead space by additionally advancing the tape one such increment at periodic intervals, for example every two minutes. To prevent overlap or interference between these distinct functions, the recording mechanism is rendered inoperative to receive demand impulses from the watthour meter during the periodic dead space advance. The mechanism 14 for punching the tape at the end of each demand interval, for example every half-hour, is also shown together with means for preventing tape movement during its operation. In order to prevent loss of registration of impulses during periodic dead space advance and tape punching, the duration of these operations should be less than the interval between successive impulses at maximum demand (in a typical case this interval is 9 seconds). This requirement is readily met by the illustrated mechanisms. The left-hand series of cams I, II, III, IV, V and VI (dead space cams) operates in the indicated sequence (corresponding to the numeral of the cam) to produce a tape advance increment once every predetermined period of time, for example two minutes. This operation is caused by a synchronous motor 70. The right-hand series of cams I' II' and III' (tape punch cams) operates in the indicated sequence, also being rotated by the motor 70, to punch a hole in the tape once every half-hour. Each set of cams operates a set of electrically conductive fingers 101–106 and 110–112, respectively fixed at their bases to insulator strips 113, 114.

The contact device 40 on the watthour meter is illustrated with the upper contacts 41 closed, thereby energizing the advancing coil 42 of the tape advancing solenoid and moving the armature 43 counterclockwise, as indicated by the arrow (a) in Fig. 1, to cause pawl 21 to advance the ratchet wheel 20. The armature 43 is pivoted at 45. It is to be understood that the watthour meter contact device 40 is so constructed that only one set of contacts can be closed at one time and the lower contacts 48 are therefore open.

Assume that while the upper contacts 41 of the meter contact device remain closed, the dead space cams I–VI have rotated counterclockwise to the point where the sequence of operation is begun. Operation of the device is then as follows.

Dropping of the cam follower or finger 101 from cam I disconnects the meter contact device 40 from the tape advancing mechanism by opening contacts 1, 2 and energizes the finger 106 and the contact 50 of the lock-in relay 51 by closing the contact 4. It will be understood that the contacts 1, 2 are insulated from the finger 101, and that all other such contacts are similarly insulated from the fingers on which they are mounted. With the armature 43 in the tape advancing position as above assumed, the microswitch 52 is in closed position and the action of cam I also energizes the coil of the relay 51 by closing the contact 4, switch 3 and switch 52 being already closed. This causes the contacts of relay 51 to close and lock in. The lock-in function is caused by completion of a circuit through wire 53 and contacts 50, 54. Next, cam II operates to drop the finger 102 and open contact 3 to open the circuit between the energized finger 106 and the microswitch 52 (the relay 51 remaining closed because of the lock-in circuit through the contacts 50 and 54) and immediately thereafter closes contact 5 to energize the solenoid advancing coil 42.

Contacts 3, 5 are specifically constructed so that contact 3 must open before contact 5 closes. Since the armature was already in the ratchet advance position, no movement takes place.

Cam III now functions to drop finger 103 to open contact 5 and then to close contact 6 to de-energize the solenoid advancing coil 42 and then to energize the solenoid return coil 60. This causes the armature 43 to be rotated clock-wise, retracting the ratchet pawl 21 (and incidentally opening the microswitch 52). Next, operation of cam IV drops finger 104 and opens contact 6 to de-energize the solenoid return coil 60, and then closes contact 7 to energize the solenoid advancing coil 42 through the contacts 50, 54 of relay 51 which are still closed (lock-in circuit). This causes the armature to be rotated counterclockwise and to advance the ratchet and close microswitch 52, registering an increment of energy. Cam V then drops finger 105 and opens contact 7 to de-energize the solenoid advancing coil 42.

At this stage, there has been a complete cycle of armature movement to advance the tape one increment, and the armature has been restored to its initial position.

Finally, cam VI drops finger 106 and thereby opens contact 4 to de-energize the contact 50 of the relay 51 (thus de-energizing its coil and causing its contacts 50, 54 to open), then closes contact 3 to close the circuit between the microswitch 52 and the contact 50 of the relay 51, and also closes contacts 1 and 2 to restore the solenoid advancing mechanisms 42, 43, 60, 20, 21 to control by the meter contact device 40.

Assuming the upper contacts 41, 41 of the meter contact device 40 are still closed when cam VI operates, the solenoid advancing coil 42 becomes energized and no movement takes places because the armature 43 was already in the ratchet advance position. On the other hand, if during the cam cycle the meter contact device 40 has operated to close its lower contacts 48, 48 and open its upper contacts 41, 41 then upon operation of cam VI the solenoid return coil 60 will be energized to rotate the armature 43 clockwise and retract the ratchet pawl 21.

From the foregoing it is evident that an increment of tape advance for accumulating the dead space was added during the cycle of operation of the dead space cams and that this was accomplished without loss of registration of demand increments.

Should the meter contact device 40 have its lower contacts 48, 48 closed at the beginning of the cycle of operation of the dead space cams I–VI a different action occurs. In this case, the return coil 60 of the tape advancing solenoid is initially energized and the ratchet pawl 21 is in retracted position, with the microswitch 52 open. As before, operation of cam I opens contacts 1 and 2 to disconnect the meter contact device 40 and energizes the contact 50 of relay 51. However, since the microswitch 52 in the relay coil circuit is open, the relay 51 remains de-energized. Upon operation of cam II, switch 3 is opened and the coil circuit of relay 51 is thus opened at still another point, preventing subsequent operation of the relay when the microswitch 52 closes, and then the solenoid advancing coil 42 is energized by the closing of switch 5 causing counterclockwise rotation of the armature 43 in the direction indicated by the arrow (a), to advance the ratchet 20. This action also closes the microswitch 52 which, however, has been rendered inoperative to close the coil circuit of relay 51 because switch 3 is open.

Cam III now functions to de-energize the solenoid advancing coil 42 and then to energize the solenoid return coil 60 causing the armature 43 to rotate clockwise and retract the ratchet pawl 21. Up to this point there has been a complete oscillation of the armature 43 and a tape advance of one increment. Operation of cam IV de-energizes the solenoid return coil 60 but now cannot energize the solenoid advancing coil 42 because the contacts of relay 51 are open. Cam V now merely breaks the inoperative connection made by cam IV. It is thus evident that the mechanism is now inactive during operation of cams IV and V.

Finally, cam VI operates as heretofore described to restore the tape advancing mechanism 60, 42, 43, 20, 21 to control by the meter contact device 40. Assuming that the lower contacts 48, 48 of this device are still closed, the solenoid return coil 60 will be energized, but no movement occurs because the ratchet pawl 21 is already in retracted position. On the other hand, if during the cam cycle the meter contact device has operated to close its upper contacts 41, 41 and to open its lower contacts 48, 48 the solenoid advancing coil 42 will be energized and will advance the ratchet pawl 21.

The cycle of operation of the tape punch cams I', II', III' de-energizes the tape advancing mechanism while the punch 14 is in operation. Cam I' opens contact 1' in the common energizing lead of the operating coils of the tape advancing mechanism and then energizes the punch. Cam II' then de-energizes the punch. Finally, cam III' reconnects the circuit opened by cam I'.

From the foregoing description of the operation of the two sets of cams, it is evident that these operations interfere with the registrations of demand impulses only to the extent of a slight delay in initiating the impulse. It is also clear that no impulses are lost.

The clock shown in Fig. 1 is of the conventional type equipped with the usual friction clutch mechanism for setting the hands. It is driven by the self-starting synchronous clock motor 70 through a gear train 71 which engages the motor through a friction clutch 72. The dead space cam series I–VI inclusive is driven from the gear train, preferably at a speed of one revolution in 2 minutes, and the tape punch cam series I'—II'—III' inclusive is correspondingly preferably driven at one revolution per half hour, the two sets of cams being arranged so that their cycles of operation are non-coincident.

Figure 7:
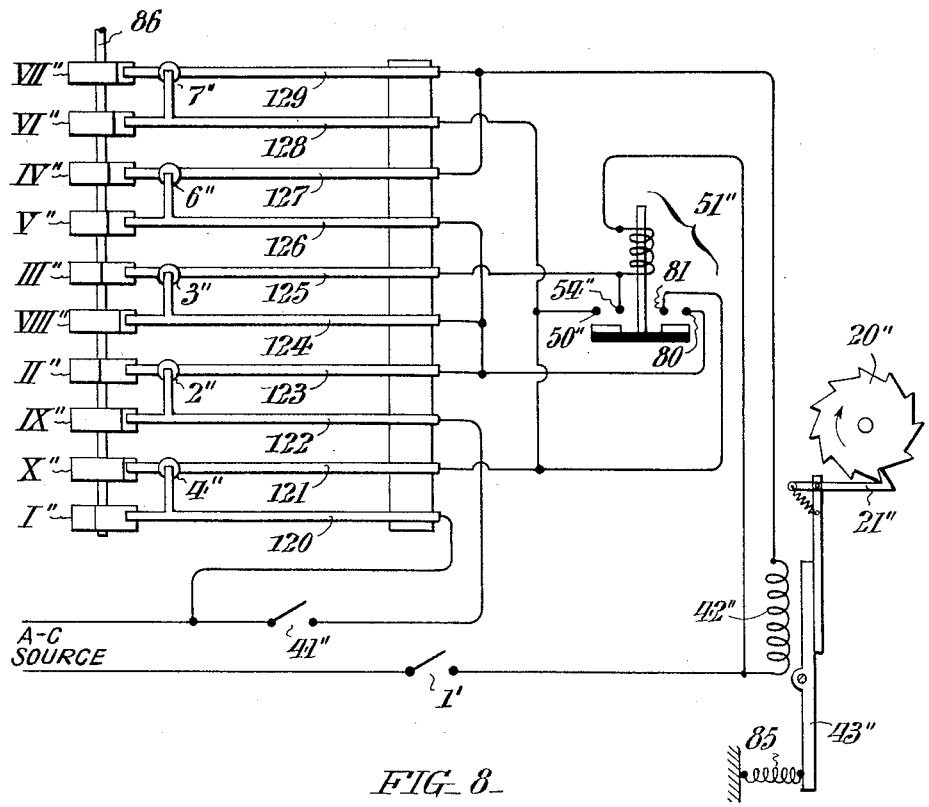
Fig. 7 represents a schematic diagram of a modification of my actuating mechanism for the tape recording means, in which the ratchet pawl is retracted by resilient rather than solenoid means.
Figure 8:
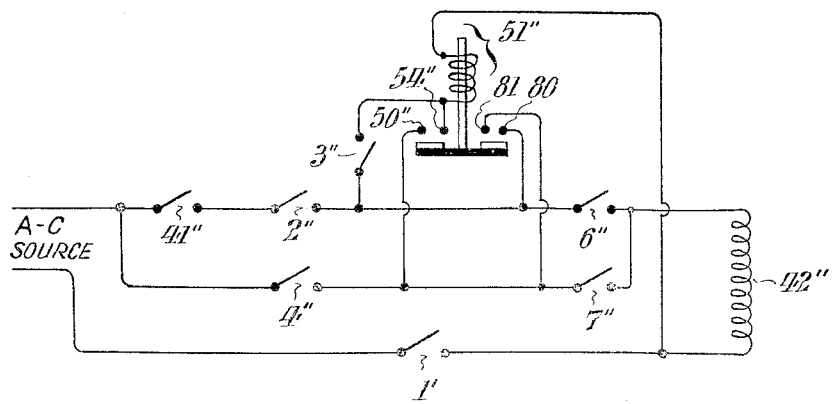
Fig. 8 represents a wiring diagram of the circuit shown in Fig. 7.

Figs. 7 and 8 show a modification of the tape advancing means in which the solenoid return coil 60 has been replaced by a spring 85. In this modification the watt-hour meter contact device 41" is the equivalent of a single-pole switch which cyclically makes and breaks the circuit for each demand impulse. The series of cams I", II", III", IV", V", VI", VII", VIII", IX" and X" (dead space cams) is operated at synchronous speed by a shaft 86, connected to the motor 70 for example in the indicated sequence (corresponding to the numeral of the cam). Contacts 2", 3" and 6", between fingers 122 and 123, 124 and 125, and 126 and 127, respectively, are normally closed between sequences of operation, and contacts 4" and 7", between fingers 120 and 121, and 128 and 129, respectively, are normally open.

Assume that while the contacts of the meter contact device 41" and the switch 1' are closed, the dead space cams I"–X" of the device of Fig. 7 have rotated to the point where the sequence of operation is about to begin. With switch 41" closed, the solenoid coil 42" and the coil of the two-circuit relay 51" are energized. Operation of the device is then as follows.

Dropping of finger 120 from cam I" closes contact 4", thereby energizing the contact 50" of relay 51" and closing a lock-in circuit for this relay through the contact 54" which is connected to the relay coil. Next cam II" operates to drop finger 123 to open contact 2". The relay 51" remains locked-in with its coil energized from contact 4" through the contacts 50" and 54", and the solenoid coil 42" is energized from contact 4" through relay contacts 50" and 54", and contact 3", and also through contacts 81 and 80. Cam III" then operates to drop finger 125 and open contact 3", leaving the relay coil locked in by way of contact 4" and relay contacts 50" and 54", with the solenoid coil 42" energized only through contact 4'', relay contacts 80 and 81 and contacts 6''.

Cam IV'' now functions to drop finger 127 and open contact 6'', deenergizing solenoid coil 42'' and permitting the spring 85 to retract the armature 43'' and pawl 21''. Cam V'' then operates to drop finger 126 and close contact 6'' to energize solenoid coil 42'' and cause ratchet 20'' to advance. Next, cam VI'' drops finger 128 to close contact 7'' which merely provides a direct electrical connection from contact 4'' to the already energized solenoid coil 42''. Cam VII'' then drops finger 129 to open the contact 7'', while solenoid coil 42'' remains energized. Now cam VIII'' drops finger 124 to close contact 3'', cam IX'' drops finger 122 to close contact 2'', and cam X'' drops finger 121 to open contact 4'', restoring the initial condition while solenoid coil 42'' remains energized.

It will be evident from the foregoing that there has been a single cycle of armature movement during operation of the cam series and a tape advance of one increment. Should the switch 41'' have opened during the cam cycle, the proper operation of pawl retraction will occur as soon as the cam cycle is completed.

Should the switch 41'' be open at the start of cam operation, the cam cycle operates differently on the solenoid coil 42'' but the mechanism will again produce a single cycle of armature movement (tape advance of one increment). Operation of the device in this case is as follows.

With the switch 41'' open, the cam cycle starts with the relay 51'' deenergized. Operation of cam I'' closes contact 4'' which has no effect because relay 51'' is deenergized. When cam II'' opens contact 2'', cam III'' opens contact 3'', and cam IV'' opens contact 6'', none of this switching has any effect because these contacts now merely open previously deenergized parts of the circuit. Cam V'' now closes contact 6'' to restore it to initial position. Operation of cam VI'' now closes contact 7'' and energizes solenoid coil 42'' to cause advance of the ratchet 20''. Opening of contact 7'' upon operation of cam VII'' deenergizes solenoid coil 42'' and spring 85 retracts armature 43'' and pawl 21''. Cam VIII'' now closes contact 3'', cam IX'' closes contact 2'', and finally cam X'' opens contact 4'' to restore initial conditions without affecting the deenergized solenoid coil 42''. As before, a tape advance of one increment has occurred during the cam cycle.

Figure 5:
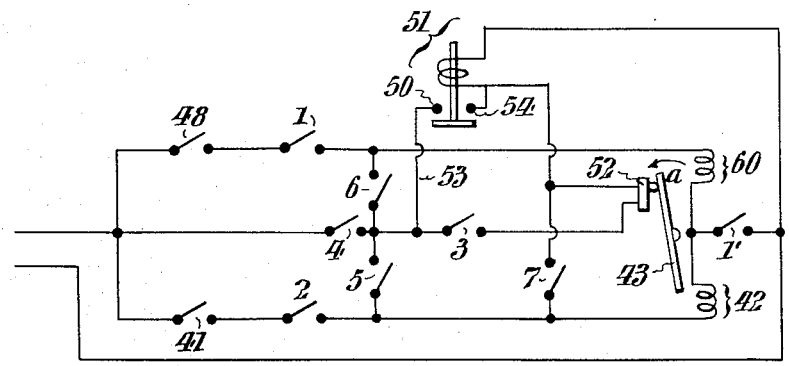
Fig. 5 represents a wiring diagram of the circuit shown in Fig. 1.

As previously explained in connection with Figs. 1 and 5, during operation of the tape punch cams I', II' and III', cam I' opens contact 1' in the lower energizing lead of the solenoid coil 42''.

Typical action of the counter system (Fig. 3) is as follows. Upon an actuation of the photocell 35 of Fig. 3, the flow of pulses to the counter is interrupted for the duration of the dead-space time. During this time the count registered by the counter is forwarded to the read-out mechanism and then the counter is reset to zero. At the end of the dead-space time, the flow of pulses to the counter is resumed for recording the demand of the succeeding demand interval.

Conversion from consecutive count to decimal notation and punching the data on the cards is readily accomplished by commercially available components, such as the well-known Berkeley data processor.

A typical end product of the read-out system is a set of cards for an automatic data processing machine, such as IBM Hollerith cards, for example, comprising the block interval demands for the record period. Each card is coded for a number of individual energy demands registered during consecutive demand intervals. The cards may be prepunched for all necessary information (date, hour, customer identification, etc.) other than the demand readings. It is also readily feasible to eliminate prepunching of the cards by arranging the read-out mechanism to punch all the desired information automatically, using conventional so-called summary punch equipment.

An alternate method of producing the desired sets of automatic data processing machine cards is to have the read-out system produce a teletype tape coded with the consecutive block interval demand readings for the record period. The individual coded demand records are punched in the tape during the respective dead-space times. This coded tape can be produced at relatively very high speeds. The desired cards would then be produced from the teletype tape as an independent operation with standard apparatus.

The read-out system may also provide two additional items of information from the recorder tape. The first is a check of overall time for comparison with time of beginning and end of tape. The second is a check of watt-hour meter registration between beginning and end of tape (from observations by the field serviceman), by totalling all the half-hour demands.

It is also contemplated that when the tape is mounted in the read-out mechanism of Fig. 3, a first set of dials may be set to correspond with the hour and date of beginning of tape, a second set of dials set for hour and date of beginning of record week (for example, 12:01 a.m., Monday), and a third set of dials set for hour and date of end of the record period. The mechanism will accumulate its information as usual, but will punch cards only for the programmed record period. If a coded teletype tape is used, this will not be a necessary function of the read-out mechanism, but the equivalent should be available for the conversion from the teletype tape to the IBM Hollerith cards.

Preliminary to beginning a test, the field serviceman sets the half-hour per revolution tape punch cams for time as accurately as possible against an index by manual counterclockwise rotation of the 2-minutes-per-revolution cam shaft. The hands of the clock are then set accurately for time.

After the record period, the serviceman observes the clock time. If it is correct, he is reasonably assured that there were no interruptions of electric service. Next, he reads the watthour meter and subtracts from this reading the previously recorded value to determine the energy used in the interim. He then notes the length of tape used, as indicated by the tape markings (preferably the sprocket holes are accurately spaced and related to the markings to provide intermediate units of length). From this he subtracts a value (readily obtained from a tabulation or by a simple computation) corresponding to the accumulated dead space advance for the period. The remainder multiplied by the appropriate constant should be equal to the energy recorded by the watthour meter. If the above two checks are positive, and the tape rolls appear to be in proper condition, there is a reasonable certainty that the tape record is accurate.

The most obvious source of error of the system is the change in length of the paper tape due to a change in temperature between the time the record is made in the field and at read-out. The possible change in length due to this cause is estimated to be of the order of 0.1%.

Because the system is not a continuous analogue, but rather a quantum analogue, it is readily possible to eliminate errors of this kind and order of magnitude. This can be illustrated as follows. Let us suppose that 60 impulses (60 operations of the watthour meter contacts), representing 60 units of energy, be received by the recorder for a specific demand interval. The recorder accordingly advances the tape by 60 standard increments of length. Also, let us predicate a recorder temperature of zero degrees Fahrenheit. On read-out, at room ambient of say 75° F., the tape will be longer by about 0.1%. On the basis of a continuous analogue, the read-out system would therefore indicate 60.06 units of energy for the particular half-hour. This is obviously inaccurate because it is known that only whole units of energy can be sensed by the meter contacts and transmitted to the recorder. The true reading is obtained by dropping the fraction.

Conversely, if the temperature in the field is considerably higher than the ambient temperature at read-out, a low reading would be observed. In this case, the true reading would be obtained by increasing the observed value to the next whole unit of energy. For example, a read-out of 59.94 units of energy should be increased to 60 units.

Provided the maximum variation in tape length for any demand interval is less than half of the incremental tape-advance corresponding to one unit of energy, the read-out system will be free of errors due to variations in length of tape if it is designed to record, for any demand interval, only the nearest rounded-out whole number of units.

Although specific forms of the invention have been referred to herein, it is to be understood that various changes in the apparatus and in the manner of its operation may be made without departing from the spirit or scope of the invention. For example, equivalent elements may be substituted for those shown in the drawings, parts may be reversed, and certain features of the invention may be used independently of other features, all as defined in the appended claims.

Having thus described my invention, I claim:

1. Recording means for making a record of periodic increments of electric power consumption comprising a meter electrically connected to measure said consumption, said meter including switch actuating means, switch means connected to be actuated by said switch actuating means at a rate proportional to said power consumption, a tape, tape notation means periodically operable to make a reproducible notation on said tape which is indicative of each said increment, main tape advancing means electrically connected for actuation by said switch means to advance said tape in proportion to said power consumption, supplemental tape advancing means connected to advance said tape independently of power consumption for a predetermined distance in a predetermined time period, and automatically operative electric cut-out means connected to said main and supplemental tape advancing means to disconnect said main advancing means when said supplemental tape advancing means is in operation.

2. In a recording means for making a tape record of increments of electric power consumption, the combination comprising an electric meter for measuring said consumption, a tape, tape advancing means arranged to advance the tape in proportion to said consumption, tape notation means periodically operable to make a reproducible notation on the tape which is indicative of each said increment, said tape advancing means comprising a pawl, an advancing solenoid connected to advance said pawl, a retracting solenoid connected to retract said pawl, and electric connections arranged to regulate the operation of said advancing and retracting solenoids, said electric connections comprising a dead-space circuit for actuating said advancing solenoid periodically independently of registration of any power consumption by said meter, a meter-actuated circuit for actuating said advancing and retracting solenoids in response to registration of power consumption by said meter, and circuit disconnecting means for disconnecting said meter-actuated circuit from said advancing solenoid when said dead-space circuit is operatively connected to energize said advancing solenoid.

3. The recording means defined in claim 2, wherein said meter-actuated circuit is arranged to be actuated once in a predetermined period of time, and wherein the dead space circuit is arranged to operate said advancing and retracting solenoids through a complete dead-space advancing cycle in a time much less than said predetermined period of time.

4. The recording means defined in claim 2, wherein said circuit disconnecting means includes a plurality of rotatable cams, and wherein said dead-space advancing means includes a plurality of cams connected for revolution in timed relation to the rotation of the cams of said circuit disconnecting means.

5. In a recording means for making a tape record of increments of electric power consumption, the combination comprising an electric meter for measuring said consumption, a tape, tape advancing means arranged to advance the tape in proportion to said consumption, tape notation means periodically operable to make a reproducible notation on the tape which is indicative of each said increment, said tape advancing means comprising a pawl, an advancing solenoid connected to advance said pawl, resilient pawl-retracting means to retract said pawl, and electric connections arranged to regulate the operation of said advancing solenoid, said electric connections comprising a dead-space circuit for actuating said advancing solenoid periodically independently of registration of any power consumption by said meter, a meter-actuated circuit for actuating said advancing solenoid in response to registration of power consumption by said meter, and circuit disconnecting means for disconnecting said meter-actuated circuit from said advancing solenoid when said dead-space circuit is operatively connected to energize said advancing solenoid.

6. Recording means for indicating periodic increments of electric power consumption comprising a tape, means for advancing the tape, tape notation means for periodically making a notation on the tape which is indicative of each said increment, main actuating means for actuating said tape advancing means in proportion to said power consumption, supplemental actuating means for actuating said tape advancing means independently of power consumption periodically through a predetermined distance, and automatic means connected electrically to said supplemental actuating means and to said tape notation means to disconnect said tape notation means when said supplemntal actuating means is operatively connected to advance the tape, and to re-connect said tape notation means after each operation of said supplemental means.

7. Recording means for making a tape record of increments of integrated demand registered by an integrating meter, comprising rotatable switch actuating means rotatable by said meter at a speed proportional to the demand, a first electric circuit, an electric switch in said circuit cooperatively associated with said actuating means for alternate opening and closing movement of said switch in response to said actuating means to produce electric pulses in said circuit, a tape, tape notation means including electromechanical integrating means for accumulating said pulses, said tape notation means being periodically operable to make a reproducible notation on the tape which is indicative of the impulses accumulated during the period, said tape notation means including electromechanical means for perforating the tape, a second electric circuit independent of said demand having capacity for advancing said tape, and means for periodically rendering said second circuit operative to advance said tape for a predetermined distance in a predetermined time and for rendering said tape notation means inoperative while retaining all of said pulses while said second circuit is operative to advance said tape.

(References on following page)

References Cited in the file of this patent

UNITED STATES PATENTS

| | | |
|---|---|---|
| 1,191,177 | Hardey | July 18, 1916 |
| 1,223,384 | Hall | Apr. 24, 1917 |
| 1,548,102 | Sherman | Aug. 4, 1925 |
| 1,592,276 | Knoop | July 13, 1926 |
| 2,073,246 | Merrick | Mar. 9, 1937 |
| 2,246,185 | Pratt | June 17, 1941 |
| 2,431,125 | Klaus | Nov. 18, 1947 |

FOREIGN PATENTS

| | | |
|---|---|---|
| 668,654 | Germany | Feb. 8, 1940 |
| 858,316 | Germany | Dec. 4, 1952 |